J. O. Haight,
Steam-Engine Piston.
No. 31,971. Patented Apr. 9, 1861.
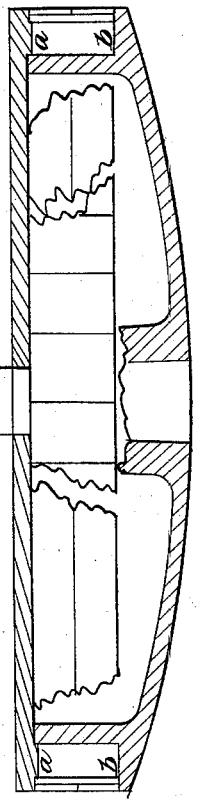
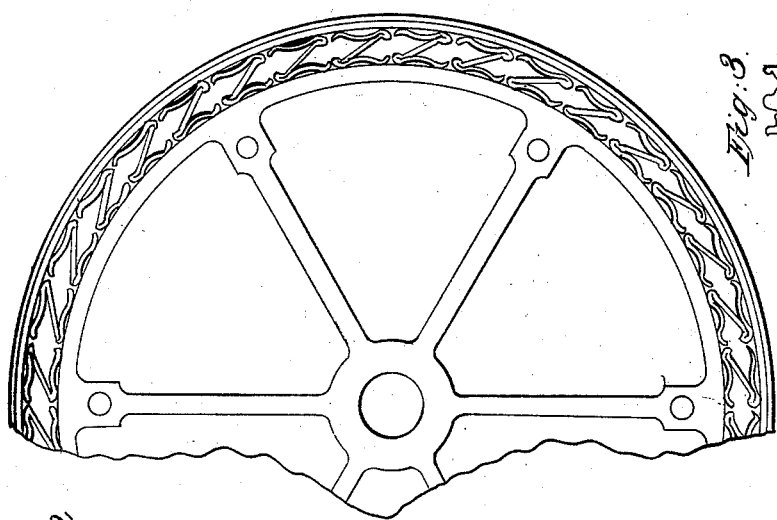
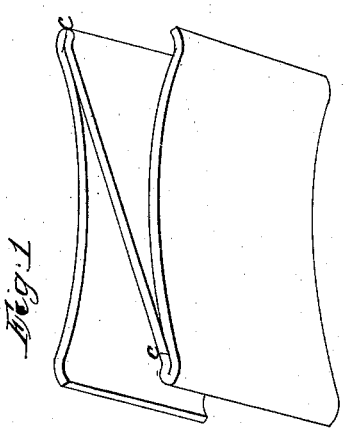
Witnesses:
Inventor:

UNITED STATES PATENT OFFICE.

JAMES O. HAIGHT, OF ALBANY, NEW YORK.

PISTON OF STEAM-ENGINES.

Specification of Letters Patent No. 31,971, dated April 9, 1861.

*To all whom it may concern:*

Be it known that I, JAMES O. HAIGHT, of the city and county of Albany, in the State of New York, have invented a new and useful Combination of Springs with Metallic Rings and with a Piston, by which combination a steam-tight joint is attained between a cylinder and a piston; and the following specification, in connection with the drawings, is a full, clear, and exact description thereof.

In the drawings Figure 1 is a perspective view of the spring on a large scale. Fig. 2 is a top or bird's-eye view of a piston with the follower removed, showing the packing rings and springs of my invention, interposed between them, and the piston. Fig. 3 is a vertical section through a piston, follower and packing rings, exhibiting the annular recess in which the springs are to lie.

Divided metallic packing rings forced toward the inside of cylinders either by springs or by screws or wedges, without any interposition of springs have long been in use as a means of making a tight joint between pistons and the cylinders in which they are contained, and it is unnecessary to describe their construction, or the manner of applying them to a piston and follower. Springs employed for the purpose have been made of various forms, such as semi-elliptic V shaped and O shaped, the two latter varieties being constructed of such stiffness and temper as may be proper for the purpose required, and then compressed and placed in position by means of a tongs, and the former variety being usually provided with set-screws, that they may be brought up to their work as wear of the rings may require. My spring is of that variety which is used without set screws. And a number of them are to be interposed between the piston and the packing ring or rings, and in order to make springs specially suitable for the purpose, certain conditions must be complied with and I have had all of them in view in making my spring. Springs proper for the purpose, must in the first place be of considerable depth edgewise, or formed of pieces of steel of considerable width as it is not convenient to use more than two tiers of them, even in the largest pistons. Secondly, they must be of such shape as not to be liable to bounce out of position as the V springs now in use are apt to do, and also of such form that the springs in one row or tier may be supported with certainty by those in the row or tier below, and also of such contour that they may take a firm solid bearing, both on the periphery of the piston and the inner surface of the packing rings, so that they shall not slide about in their containing recess, or be tilted or twisted when the packing rings move around the piston. Thirdly, they require but a limited range of motion, and should increase rapidly in elasticity, or in resistance to compression, so that their power may be developed in the small space between the piston and the interior of the rings, and lastly, they must be comparatively inexpensive as great numbers of them are used in a single piston and they are often broken by careless handling in packing and unpacking pistons. To secure the latter requisite, the weight of steel must be light in proportion to the tension that can be exerted by the spring, and the spring should be made of such shapes of steel as are ordinarily sold in the market, by bending only and without any need of forging, or swaging for the purpose of changing the thickness or the cross section of the metal in any part. Now I know of no spring that complies with all of these conditions, except that invented by me, and experimental use in a number of pistons and continued through a considerable space of time, has proved that it does meet all the requirements.

In order to make one of my springs, I cut a piece off of a flat bar, hoop or ribbon of steel whose cross section is such as may be suitable the width of the bar, being equal to the depth of the annular recess (as from $a$ to $b$ in Fig. 3) or to one half thereof in large pistons, so that two tier of springs may be fitted in. The thickness of the bar will depend upon the distance between the piston and the inner surface of the rings—upon the pressure desired upon each square inch of the packing rings—upon the length of the spring, measured along the circumference of the cylinder, and in some measure upon the quality of the steel. The length of the piece cut off will be governed by the length of the spring desired. No precise rules can be given on these points, as each case has its own requirements, but the directions given, will be sufficient to inform those accustomed to make packing springs such as are now in use. The bar after being cut off, is to be heated and bent substantially, into the shape shown in the drawings, into what may be termed a Z shape, but in so doing care must be taken that the steel where it turns at the angles, shall be bent down closely upon itself as shown at c, c, so that great resistance to compression may be secured, with a comparatively thin piece of steel, so that the range of motion of the spring shall be small, and so that its resistance to compression shall increase rapidly as it is compressed. The top and bottom of the Z must be bent so as to accommodate themselves to, and have a firm bearing upon the periphery of the piston and the inner surface of the rings, and I prefer the shape as shown in Fig. 1, as that shape prevents one spring from sliding by another, insures the hold of a tongs employed to compress them and at the same time bears firmly as required against both ring and piston. When the bending of the spring is completed, it is to be tempered to the desired degree, in any proper manner and when the springs are to be used in more than one tier, those of the upper are to be set in the reversed direction to those of the lower tier; that is to say, so that the middle bars of the Z in one tier, will cross those in the other, and not lie parallel to them. If these directions be carefully complied with, both as to manufacture and setting in position, it will be found that the spring possesses all the good qualities, which I have stated as being desirable.

Now to those acquainted with the subject, it will be obvious, that a spring of the same contour or Z shape as mine, if formed of a round rod or wire, would be useless; that a spring made even of flat steel, would be comparatively valueless, if an open circular turn were employed instead of the acute angle, shown at the corners of my Z, for in such a case the range of motion of the spring would be great, and its increase of resistance as compressed would be small and moreover a much heavier and dearer piece of steel would be needed, in order to afford the required resistance to compression. It will also be obvious that a spring having two diagonals and an intermediate straight bar, thus, Z, would also be valueless: first, because it would be almost impossible, to make such a spring, when limited to the small distance between a piston and a packing ring; second, because its range of motion would be too great as compared with its increased power of resistance when compressed; and thirdly because it would be too costly, as it would require to be made of steel of greater thickness.

Having thus clearly described my spring and its construction, it is hardly necessary to state that I do not claim such a spring as is described in the rejected application of Jonathan Ball, for Letters Patent for a vest spring—rejected June 15th, 1843. But I do claim as of my own invention—

The combination of a divided packing ring or rings, with a piston, by means of a spring made out of a flat bar or ribbon of steel, bent into a Z shape, substantially as hereinbefore described, so as to attain the advantages herein set forth, the spring used in the combination being as an entirety, substantially such as herein described.

In testimony whereof I have hereunto subscribed my name on this eighth day of March, A. D. 1861.

JAMES O. HAIGHT.

In presence of—
J. J. GALLUP,
WILLIAM SCRANTON.